(12) United States Patent
Chen (10) Patent No.: US 11,808,719 B2
(45) Date of Patent: Nov. 7, 2023

(54) DEVICE AND METHOD FOR MEASURING TOTAL CROSS-SECTIONAL PHASE FRACTION OF MULTIPHASE FLOW BASED ON RAY COINCIDENCE MEASUREMENT

(71) Applicant: Sea Pioneers Technologies Co., Ltd., Wuxi (CN)

(72) Inventor: Jige Chen, Wuxi (CN)

(73) Assignee: SEA PIONEERS TECHNOLOGIES CO., LTD., Wuxi (CN)

( * ) Notice: Subject to any disclaimer, the term of this patent is extended or adjusted under 35 U.S.C. 154(b) by 183 days.

(21) Appl. No.: 17/361,392

(22) Filed: Jun. 29, 2021

(65) Prior Publication Data

US 2021/0325320 A1   Oct. 21, 2021

Related U.S. Application Data

(63) Continuation-in-part of application No. PCT/CN2019/080005, filed on Mar. 28, 2019.

(30) Foreign Application Priority Data

Dec. 29, 2018 (CN) .......................... 201811639661.3

(51) Int. Cl.
*G01N 23/12* (2018.01)
*G01T 1/20* (2006.01)
*G01F 1/74* (2006.01)
*G01T 1/202* (2006.01)

(52) U.S. Cl.
CPC ............... *G01N 23/12* (2013.01); *G01F 1/74* (2013.01); *G01T 1/202* (2013.01); *G01T 1/2023* (2013.01); *G01N 2223/04* (2013.01); *G01N 2223/202* (2013.01); *G01N 2223/505* (2013.01); *G01N 2223/5055* (2013.01); *G01N 2223/605* (2013.01); *G01N 2223/635* (2013.01)

(58) Field of Classification Search
CPC ...... G01F 1/74; G01N 23/12; G01N 2223/04; G01N 2223/202; G01N 2223/505; G01N 2223/5055; G01N 2223/605; G01N 2223/635; G01T 1/202; G01T 1/2023
See application file for complete search history.

(56) References Cited

U.S. PATENT DOCUMENTS

| 7,633,057 | B2 * | 12/2009 | Cooke | G01T 1/202 250/252.1 |
|---|---|---|---|---|
| 9,606,245 | B1 * | 3/2017 | Czarnecki | G01T 1/208 |
| 9,958,559 | B1 * | 5/2018 | Feng | G01T 1/2985 |
| 2010/0301198 | A1 * | 12/2010 | Berheide | G01T 1/202 250/252.1 |

* cited by examiner

*Primary Examiner* — Mark R Gaworecki
(74) *Attorney, Agent, or Firm* — MATTHIAS SCHOLL P.C.; Matthias Scholl (57) ABSTRACT

A device for measuring a total cross-sectional phase fraction of a multiphase flow includes a scintillation crystal and a detector. The scintillation crystal is coupled to the detector; and the scintillation crystal includes lutetium-176.

10 Claims, 4 Drawing Sheets

DEVICE AND METHOD FOR MEASURING TOTAL CROSS-SECTIONAL PHASE FRACTION OF MULTIPHASE FLOW BASED ON RAY COINCIDENCE MEASUREMENT

CROSS-REFERENCE TO RELATED APPLICATIONS

This application is a continuation-in-part of International Patent Application No. PCT/CN2019/080005 with an international filing date of Mar. 28, 2019, designating the United States, now pending, and further claims foreign priority benefits to Chinese Patent Application No. 201811639661.3 filed Dec. 29, 2018. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to the field of multiphase fluids, and more particularly to a device and a method for measuring a total cross-sectional phase fraction of a multiphase flow based on ray coincidence measurement.

The phase refers to one of the distinct forms in which matter can exist with the same composition and the same physical and chemical properties in a system, and there is an obvious separable interface between the phases. Multiphase fluid is a common fluid form in the industrial production. It is composed of two or more phases with obvious interfaces, including gas/liquid, liquid/solid, gas/solid, liquid/liquid two-phase flow, as well as gas/liquid/liquid, gas/liquid/solid multiphase flow, etc. There are a large number of two-phase flow and multiphase flow measurement problems in industrial processes, life sciences, and nature, etc., for example, the gas-solid two-phase flow in the pulverized coal transmission process of thermal power equipment and the pneumatic conveying device of grain processing, the gas-liquid two-phase flow in the production processes of industrial boiler systems and oil wells, the liquid-solid two-phase flow in the extraction of sediments in the offshore oil industry and the pulp flow process in the paper industry, as well as the liquid-liquid two-phase flow of water and petroleum in oil pipelines in petroleum production, and various two-phase fluids in the transportation of two substances in metallurgical or chemical engineering.

These two-phase flows seem to be simple, but the law of motion thereof is complicated. Accurately and timely understanding various movement parameters of the two-phase fluid is of important practical significance to the design of industrial equipment, the accurate measurement of raw materials, and the control of production safety and efficiency, etc. For example, in a thermal power plant, when the burner injects the pulverized coal and air into the furnace simultaneously, the ratio of pulverized coal to air directly determines the power generation efficiency of coal; in an oil extraction device, the crude oil together with the natural gas are extracted into the oil pipeline and the oil content and gas content are measured, which is of great significance for guiding petroleum production; in the chemical and metallurgical industries, the transportation and proportioning of raw materials require accurate measurement, which is very important for the economical production and safe production.

Compared with a single-phase flow, the two-phase flow or multiphase flow is complicated in flow characteristics and has interfacial effects and relative speeds between phases, and there are many distribution parameters that need to be detected in the multi-phase fluid, which increases the difficulties of parameter detection. Traditional multiphase flow parameter detection is mainly completed by a phase separation method and manual assay method. The phase separation method requires large-scale separation equipment. After a period of standing, the multiphase fluid is separated into single-phase fluids mainly by gravity, and then a single-phase flow meter is used for measurement. The phase separation method is simple and reliable, and the measurement results are not affected by factors such as flow pattern changes. However, the required separation equipment is bulky and expensive, and is incapable of real-time online detection. For the manual assay method, the sampling is made in local points and the information of local points is used to replace the form of the entire fluid flow, which has great randomness and cannot accurately reflect the phase-separate flow of the fluid.

The main purpose of applying ray technology to industrial two-phase flow detection is to measure the mass fraction of two-phase flow and identify the flow pattern. The principle of ray attenuation is used to detect the phase volume fraction and flow pattern of multiphase pipe flow, without destroying the pipe structure. It is a non-invasive and non-destructive measurement technology. The basic principle is to receive the rays transmitted through the two-phase pipe flow through the detector array, and obtain a series of attenuation data (projection), and then reconstruct the images after denoising and correcting these data, to obtain the two-dimensional tomographic image of ray transmission section of two-phase pipe flow. Therefore, the technical solution has the advantages of high measurement accuracy, good imaging resolution, simple structure, and wide applicability, etc. However, in the traditional industrial imaging process using ray technology, a radiation device capable of generating a certain amount of radiation must be required, such as an X-ray tube, Cs-137 radiation source, etc. Due to the existence of the radiation device, related testing equipment must be protected and supervised, to avoid the accidents. Therefore, there are many inconveniences in the promotion and application of imaging equipment based on radiographic technology.

In the related art, a multiphase flow positron tomography device and method is disclosed. The device utilizes positron and negatron annihilation to generate a pair of compatible 511 keV energy γ-rays as a tomographic imaging method, providing on-line tomographic imaging for multiphase flow metering in oil pipelines. The device includes multiple sets of parallel high-precision gamma-ray detector arrays, positron emission sources and shields arranged in a specific spatial structure, which can obtain the phase fraction of multiphase flow mixtures such as oil, gas and water under the condition of a single radioactive source by combining with the image processing functions. The design of multiple sets of high-precision detector arrays greatly improves the accuracy of multiphase flow measurement and its applicability under different flow patterns of multiphase flow. The fluid image information it produces will greatly enrich the oil and gas measurement information in the oil and gas industry and provide basic data for more effective reservoir management and production optimization.

In the related art, the design of the positron emission source is relatively complicated, and requires protection and supervision, with high costs; in addition, the decay period (half-life) of the positron emission source is short, easy to age and needs frequent replacement to ensure its stable performances.

SUMMARY

The disclosure provides a device and a method for measuring a total cross-sectional phase fraction of a multiphase flow based on ray coincidence measurement, which accurately acquires the ray energy information, time information and position information through the ray detection technology of the intrinsic radiation of scintillation crystals, to realize total cross-section measurement.

To achieve the above object, the disclosure provides a device for measuring a total cross-sectional phase fraction of a multiphase flow based on ray coincidence measurement, the device comprising a scintillation crystal and a detector; the scintillation crystal is coupled to the detector; and the scintillation crystal comprises lutetium-176.

Scintillation crystals, as a material used in ray detection technology, are capable of converting high-energy γ-rays into low-energy visible light fluorescence, which are then detected by photoelectric converters and are converted into electrical signals. At present, commonly used scintillation crystals include sodium iodide (NaI), lutetium oxyorthosilicate (LSO), etc. When in use, a plurality of aforesaid devices is disposed on the circumferential direction of the fluid pipe. Following the above principle, based on the high-precision time measurement technique and the coincidence detection technique, the flight path of γ-rays, namely, the line of response, is obtained. Through a large number of lines of response, the corresponding imaging technologies such as the filter back projection technology, Ordered Subsets Expectation Maximization, etc., can be used to achieve the total cross-sectional measurement of the fluid to be detected.

The lutetium element scintillation crystal comprises Lu-176 radioactive isotope, which emits β-rays during the decay process, and the β-rays rapidly decay to produce γ-rays. Because of weak penetration ability, β-rays can be detected in the locality where they are generated, while γ-rays have relatively strong penetration ability, which can penetrate the fluid to be tested and then be detected. Therefore, according to this principle, the β-ray detection position can be used as the starting point of the γ-ray. After the corresponding γ-ray passes through the fluid pipe under test, it is detected by the detector located at the corresponding position of the pipe, which is used as the destination point, thereby obtaining the flight path of the γ-ray. By using the intrinsic rays of the scintillation crystal to perform total cross-section measurement, the radioactive sources in the ray measuring device can be eliminated, to reduce the system cost and greatly improve the system safety and reliability. In addition, because the half-life of Lu-176 is $2.1 \times 10^{10}$ years, the equipment performance will not degrade caused by the aging of the radiation device, which greatly improves the system stability and service life.

In a class of this embodiment, the scintillation crystal and the detector are fixedly coupled to each other by a couplant.

The scintillation crystal is a high-density crystal. The surface of the detector is provided with a layer of epoxy resin. When the light is emitted from the scintillation crystal to the detector, it is emitted from an optically denser medium to an optically thinner medium. If air exists between them, total reflection easily occurs, causing light loss. Optical couplants, especially optical couplers, are transparent media with large refractive index. When couplants are positioned between the scintillation crystal and the detector, the air can be effectively eliminated and the light loss caused by total reflection can be significantly reduced. The couplant may be a silica gel to bond the scintillation crystal to the detector, effectively reducing the loss of light from the scintillation crystal to the detector and improving the photoelectric conversion efficiency.

The disclosure further provides a method for measuring a total cross-sectional phase fraction of a multiphase flow based on ray coincidence measurement, the method comprising:

1) disposing a plurality of devices for measuring a total cross-sectional phase fraction of a multiphase flow in a circumferential direction of a fluid pipe under test, aligning the scintillation crystal of each device with the fluid pipe, and disposing the scintillation crystal between the fluid pipe and the detector;
2) decaying the scintillation crystal to emit intrinsic rays;
3) allowing the intrinsic rays to pass through the fluid pipe under test, and detecting, by the detector, a starting point and an end point of the intrinsic rays, and converting optical signals, by the detector, into electrical signals;
4) acquiring corresponding lines of responses according to the intrinsic rays produced by each decay and transmission paths thereof; and
5) finding out all effective lines of responses and calculating a mass fraction of a multiphase fluid based on an energy and path of the lines of responses.

In a class of this embodiment, in 4), the intrinsic rays produced by each decay comprise the β-rays and γ-rays produced by each decay of the scintillation crystal comprising lutetium-176. The effective γ-rays are determined by a coincidence detection technology and an energy detection technology.

Since the energy spectrum of Lu-176 is known, β-rays will be produced during the decay process, and the decay of the β-rays will produce three energy levels of γ-rays, that is, 307 keV, 202 keV, and 88 keV respectively. If one or more of the three types of γ-rays are detected within a period of time after decay of β-rays, the detected γ-rays are valid, and if none of the three types of γ-rays is detected, this decay process is invalid.

In a class of this embodiment, the coincidence detection technology comprises acquiring the γ-rays that are detected within a period of time and coincide with an energy level standard.

A period of time refers to the time when β-rays decay to produce γ-rays and the γ-rays are detected by a detector after γ-rays are emitted, which is usually less than 10 picoseconds. If beyond the period of time, the rays detected may not be the γ-rays produced by this β-ray decay. The coincidence with the energy level standard means that the energy level of the detected γ-rays is one of 307 keV, 202 keV and 88 keV, and if it is not, it is inaccurate, then the detection is abandoned.

In a class of this embodiment, the energy detection technology comprises analyzing and studying the shape and noise characteristics of γ-ray and β-ray scintillation pulses, designing a corresponding data acquisition methods, eliminating the interference and accurately acquiring the γ-ray energy information.

In a class of this embodiment, the calculation of the mass fraction of the fluid of the disclosure comprises the following steps:

S1. conducting statistics on the position information of γ-rays detected by a detector when the fluid pipe under test is in an empty state;

S2. conducting statistics on the position information and energy information detected by the detector when a single-phase fluid flows through the fluid pipe under test, and calculating a mass absorption coefficient of the single-phase fluid for γ-rays;

S3. conducting statistics on the position information and energy information detected by the detector when a multiphase fluid flows through the fluid pipe under test, and calculating a mass absorption coefficient of the multiphase fluid for γ-rays; and S4. calculating, based on the mass absorption coefficient of the multiphase fluid and the mass absorption coefficient of the single-phase fluid, the mass fraction of each single-phase fluid in the multiphase fluid.

In a class of this embodiment, S1 is carried out as follows:

S1.1. making a distinctive mark for each scintillation crystal, measuring a linear distance between every two scintillation crystals, and recording as $X_{mn}$, m and n being marks of the two scintillation crystals, respectively; and S1.2. in the empty state, recording a number of times of γ-rays received by each scintillation crystal from each of other scintillation crystals as $N_{mn}$, m being each of other scintillation crystals emitting γ-rays, and n being the scintillation crystal receiving γ-rays.

In a class of this embodiment, S2 is carried out as follows:

S2.1. when the single-phase fluid flows through the fluid pipe, recording a number of times of γ-rays received by each scintillation crystal from each of other scintillation crystals as $N'_{mn}$, m being each of other scintillation crystals emitting γ-rays, and n being the scintillation crystal receiving γ-rays;

S2.2. calculating a value of μ according to the formula: $N'_{mn}=N_{mn}e^{-\mu X_{mn}}$, where μ represents the mass absorption coefficient of the single-phase fluid to γ-rays.

In a class of this embodiment, S3 is carried out as follows:

S3.1. when the multiphase fluid flows through the fluid pipe, recording a number of times of γ-rays received by each scintillation crystal from each of other scintillation crystals as $N''_{mn}$, m being each of other scintillation crystals emitting γ-rays, and n being the scintillation crystal receiving γ-rays;

S3.2. calculating a value of μ' according to the formula: $N''_{mn}=N_{mn}e^{-\mu' X_{mn}}$, where μ' represents the mass absorption coefficient of the multiphase fluid to γ-rays.

In a class of this embodiment, in S4, the specific method is as follows:

$$\mu'=\eta\mu_1+(1-\eta)\mu_2;$$

where, $\mu_1$ and $\mu_2$ are mass absorption coefficients of each single-phase fluid in the multiphase fluid to γ-rays, η is calculated from the formula and performed by weighted average, to obtain the mass fraction of the multiphase fluid.

The following advantages are associated with the device and method for measuring a total cross-sectional phase fraction of a multiphase flow based on ray coincidence measurement. By using the intrinsic rays of the scintillation crystal to perform total cross-section measurement, the radioactive sources in the ray measuring device can be eliminated, to reduce the system cost and greatly improve the system safety and reliability. In addition, because the half-life of Lu-176 is $2.1\times10^{10}$ years, the equipment performance will not degrade caused by the aging of the radiation device, which greatly improves the system stability and service life. The energy information, time information and position information of γ-rays and the position information and time information of β-rays are accurately obtained using the new data processing method; and according to the corresponding algorithm, the mass fraction of the multiphase flow is calculated.

DETAILED DESCRIPTION

To further illustrate, embodiments detailing a device and a method for measuring a total cross-sectional phase fraction of a multiphase flow based on ray coincidence measurement are described below. It should be noted that the following embodiments are intended to describe and not to limit the disclosure.

Example 1

Figure 1:
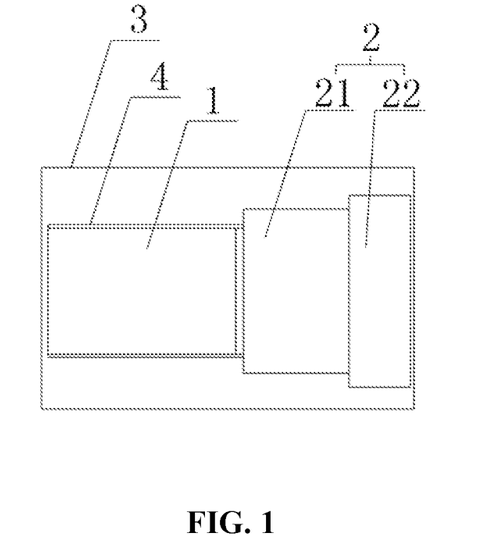
FIG. 1 is a schematic view of a device for measuring a total cross-sectional phase fraction of a multiphase flow based on ray coincidence measurement in Example 1.

As shown in FIG. 1, a device for measuring a total cross-sectional phase fraction of a multiphase flow based on ray coincidence measurement, comprising a scintillation crystal 1 and a detector 2. The scintillation crystal 1 is coupled to the detector 2; the scintillation crystal 1 is a scintillation crystal 1 comprising lutetium-176.

Scintillation crystals 1, as a material often used in ray detection technology, are capable of converting high-energy γ-rays into low-energy visible light fluorescence, which are then detected by photoelectric converters to convert into electrical signals. At present, commonly used scintillation crystals 1 include sodium iodide (NaI), lutetium oxyorthosilicate (LSO), etc. When in use, a plurality of measuring devices, that is, the devices for measuring the total cross-sectional phase fraction of a multiphase flow of the disclosure, is disposed on the circumferential direction of the fluid pipe. Following the above principle, based on the high-precision time measurement technique and the coincidence detection technique, the flight path of γ-rays, namely, the line of response, is obtained. Through a large number of lines of response, the corresponding imaging technologies such as the filter back projection technology, Ordered Subsets Expectation Maximization, etc., can be used to achieve the total cross-sectional measurement of the multiphase fluid to be detected.

The scintillation crystal 1 comprises Lu-176 radioactive isotope, which emits β-rays during the decay process, and the β-rays rapidly decay to produce γ-rays, such as sheet-like LSO scintillation crystal 1, plastic lutetium-yttrium orthosilicate scintillation crystal (LYSO), etc. Because of weak penetration ability, β-rays can be detected in the locality where they are generated, while γ-rays have relatively strong penetration ability, which can penetrate the fluid to be tested and then be detected. Therefore, according to this principle, the β-ray detection position can be used as the starting point of the γ-ray. After the corresponding γ-ray passes through the fluid pipe under test, it is detected by the detector 2 located at the corresponding position of the pipe, which is used as the destination point, thereby obtaining the flight path of the γ-ray. By using the intrinsic rays of the scintillation crystal to perform total cross-section measurement, the radioactive sources in the ray measuring device can be eliminated, to reduce the system cost and greatly improve the system safety and reliability. In addition, because the half-life of Lu-176 is $2.1 \times 10^{10}$ years, the equipment performance will not degrade caused by the aging of the radiation device, which greatly improves the system stability and service life.

In this embodiment, the scintillation crystal 1 and the detector 2 are mounted in a bracket 3. The bracket 3 facilitates the mounting and use of the measuring device, and further facilitates the storage of the scintillation crystal 1 and the detector 2. In actual use, the measuring device is mounted in alignment with the fluid pipe, to facilitate the positioning of the measuring device by the bracket 3.

When in use, a plurality of measuring devices is configured to detect the fluid pipe. Therefore, the material of the bracket 3 where the scintillation crystal 1 is mounted is metal material, to prevent the γ-rays emitted by the scintillation crystal 1 from being detected by other surrounding measuring device before passing through the fluid pipe, reducing the chance of mutual interference.

The commonly used insulating metal material is lead. In this embodiment, a tungsten-base alloy is used. The tungsten-base alloy is a high-density metal with good mechanical processing characteristics, and has a better protection effect than lead. In addition, the tungsten-base alloy has better blocking effect on γ-rays and prevents the detector 2 from interfering with each other.

In this example, a reflective film 4 is provided on the surface of the scintillation crystal 1.

The scintillation crystal 1 has a certain volume, and the detector 2 is coupled to one end of the scintillation crystal 1, so most of the light generated by the scintillation crystal 1 needs to be reflected multiple times to be absorbed by the detector 2. A reflective film 4 is coated on the surface of the scintillation crystal 1, which increases the reflection probability and improves the light collection efficiency of the detector 2. The reflective film 4 can be an aluminum foil, which is coordinated with the scintillation crystal 1 to achieve high reflection efficiency.

The scintillation crystal 1 is generally a high-density crystal, and the surface of the detector 2 is provided with a layer of epoxy resin. When the light is emitted from the scintillation crystal 1 to the detector 2, it is emitted from an optically denser medium to an optically thinner medium. If air exists between them, total reflection easily occurs, causing light loss. Optical couplants, especially optical couplers, are transparent media with large refractive index. When couplants are positioned between the scintillation crystal and the detector, the air can be effectively eliminated and the light loss caused by total reflection can be significantly reduced.

Therefore, in this example, the scintillation crystal 1 and the detector 2 are fixed by a couplant. The couplant may be a silica gel to bond the scintillation crystal 1 to the detector 2, effectively reducing the loss of light from the scintillation crystal 1 to the detector 2 and improving the photoelectric conversion efficiency.

In this example, the detector 2 comprises a photomultiplier tube 21 and a modular circuit 22.

The photomultiplier tube 21 (PMT) is a traditional photoelectric conversion device with extremely high sensitivity and ultra-fast time response, which can quickly and effectively convert the optical signals of the rays into electrical signals.

Figure 2:
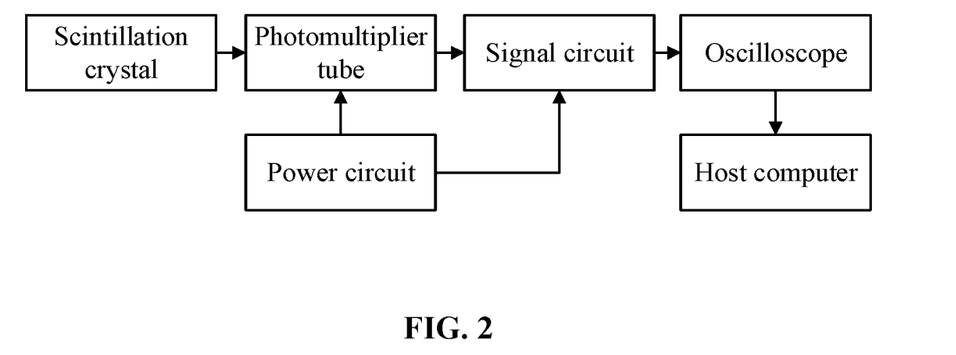
FIG. 2 is a schematic diagram of Example 1.

As shown in FIG. 2, the modular circuit 22 comprises a power circuit and a signal circuit. The power circuit provides power for the photomultiplier tube 21 and the signal circuit. Generally, only a direct current within a reasonable range is sufficient, and an AC-DC power adapter can be used for power supply, or batteries can be used directly for power supply. The signal circuit mainly processes the pulse signals output by the photomultiplier tube 21. Since the amplitude of signals output from the photomultiplier tube 21 is very small, generally the signals need to be processed by such as amplification, noise reduction, etc.

Since the power circuit and the signal circuit are some conventional design circuits, those skilled in the art can adopt them according to the actual needs, and the specific circuit diagrams are not disclosed in this embodiment.

The working principle of this example is as follows. A plastic scintillation crystal LYSO is used, and a measuring device is mounted on the outer surface of the fluid pipe, and the scintillation crystal 1 is aligned with the fluid pipe for detection. The scintillation crystal 1 decays to generate β-rays, which are detected by the detector 22 adjacent to the scintillation crystal 11; at the same time, the γ-rays generated by the decay of β-rays pass through the fluid pipe and are detected by the measuring device on the other side of the pipe.

The scintillation crystal 1 converts rays into fluorescence, the photomultiplier tube 21 converts light signals into electrical signals, and the modular circuit 22 implements processing of the electrical signals such as amplification and noise reduction, etc. before outputting. An oscilloscope is provided to observe or convert the signals, and finally the collected waveforms are stored and analyzed and the mass fraction of the fluid is calculated by a host computer.

In this example, by using the intrinsic rays of the scintillation crystal 1 to perform total cross-section measurement, the radioactive sources in the ray measurement apparatus can be eliminated, to reduce the system cost and greatly improve the system safety and reliability. In addition, because the half-life of Lu-176 is $2.1 \times 10^{10}$ years, the equipment performance will not degrade caused by the aging of the radiation device, which greatly improves the system stability and service life.

Example 2

The difference between this example and Example 1 is that the photomultiplier tube 21 is replaced with a semiconductor silicon detector 2.

The semiconductor silicon detector 2 (SiPMT) is a novel detector 2. After the photons are absorbed, a current is generated in the SiPMT and multiplied, which can output a larger current signal and can be received by the modular circuit 22. In this embodiment, the detection efficiency of γ-rays is higher and the volume is smaller.

Example 3

A method for measuring a total cross-sectional phase fraction of a multiphase flow based on ray coincidence measurement, which adopts the measuring device in Example 1 or 2, is detailed as follows.

Figure 3:
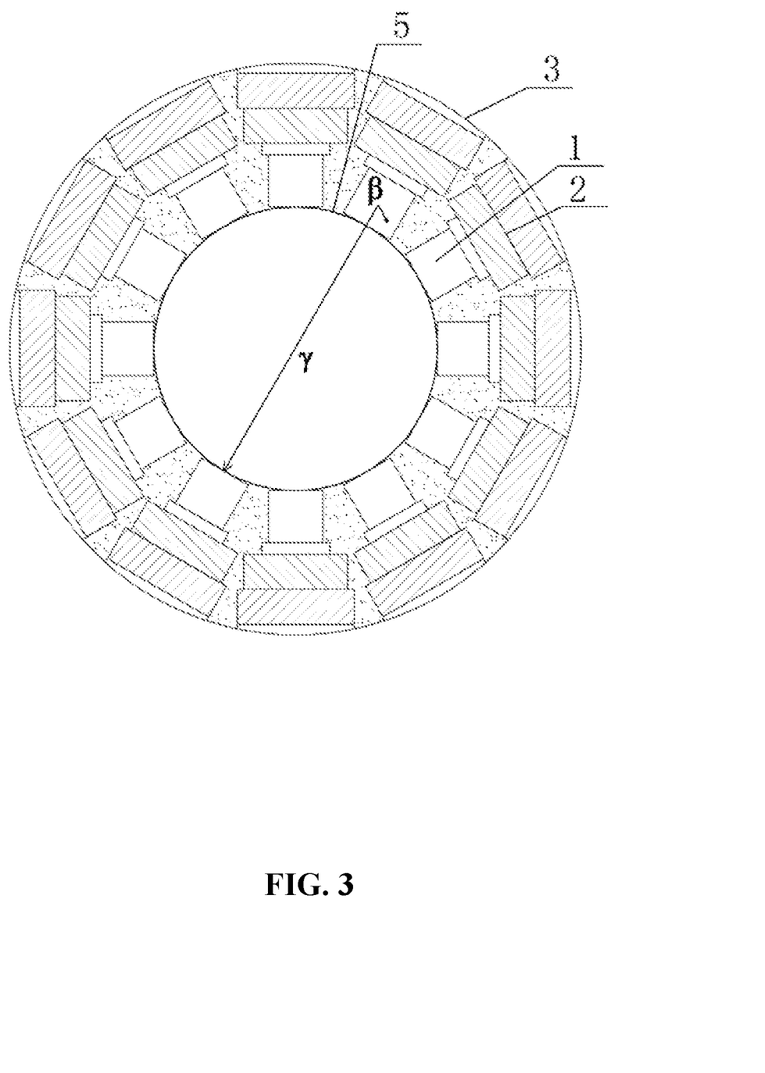
FIG. 3 is a schematic view of Example 3 where a plurality of devices for measuring a total cross-sectional phase fraction of a multiphase flow is used.

As shown in FIG. 3, a plurality of evenly distributed measuring devices is disposed in the circumferential direction of the fluid pipe under test 3. The measuring device comprises a scintillation crystal 1 and a detector 2. The scintillation crystal 1 is aligned with the fluid pipe under test 3, and the scintillation crystal 1 is positioned between the fluid pipe under test 3 and the detector 2.

The scintillation crystal 1 used is a scintillation crystal comprising lutetium, such as a sheet-like LSO scintillation crystal, a plastic scintillation crystal LYSO, etc.

The scintillation crystal 1, as a material often used in ray detection technology, is capable of converting high-energy γ-rays into low-energy visible light fluorescence, which are then detected by the detector 2 to convert into electrical signals. The scintillation crystal 1 comprises Lu-176 radioactive isotope, which emits β-rays during the decay process, and the β-rays rapidly decay to produce γ-rays. Because of weak penetration ability, β-rays can be detected in the locality where they are generated, while γ-rays have relatively strong penetration ability, which can penetrate the fluid to be tested and then be detected. Therefore, according to this principle, the β-ray detection position can be used as the starting point of the γ-ray. After the corresponding γ-ray passes through the fluid pipe under test 3, it is detected by the detector 2 located at the corresponding position of the pipe, which is used as the destination point, thereby obtaining the path of the γ-ray.

The detector 2 is configured to convert the detected β-rays and γ-rays into electrical signals, and obtain a large number of scintillation pulses containing time, energy, and position information through an oscilloscope, and store them in the host computer to establish a scintillation pulse database.

The sheet-like LSO scintillation crystal 1 decays to generate β-rays, which are detected by the detector 2 adjacent to the scintillation crystal 1; at the same time, the γ-rays generated by the decay of β-rays pass through the fluid pipe and are detected by the detector 2 on the other side of the pipe. The two detectors 2 can detect the position information which γ-rays access to, and record this information in the database.

Figure 4:
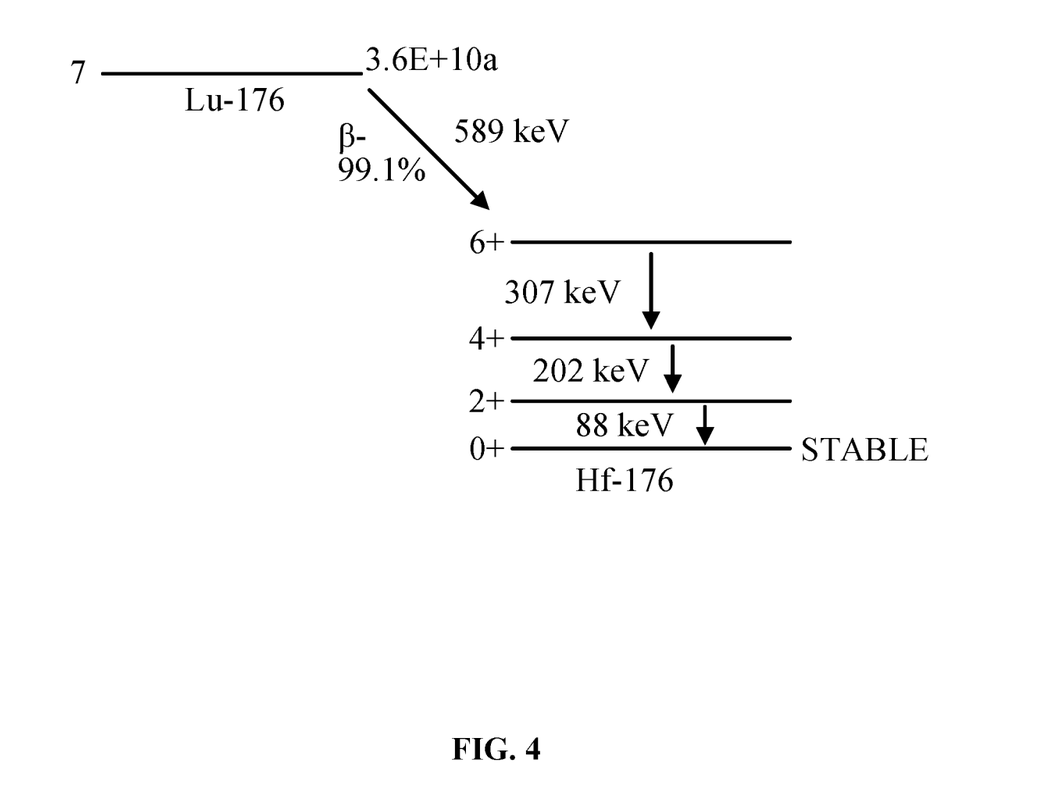
FIG. 4 is a schematic diagram showing a decay process of Lu-176 in Example 3.

As shown in FIG. 4, since the energy spectrum of Lu-176 is known, β-rays will be produced during the decay process, and the decay of the β-rays will produce three energy levels of γ-rays, that is, 307 keV, 202 keV, and 88 keV respectively. If one or more of the three types β-rays are detected within a period of time after decay of β-rays, the detected γ-rays are valid, and if none of the three types of γ-rays is detected, this decay process will not be recorded by the detector 2.

A period of time refers to the time when β-rays decay to produce γ-rays and the γ-rays are detected by the detector 2 after γ-rays are emitted, which is usually less than 10 picoseconds. If beyond the period of time, the rays detected may not be the γ-rays produced by this β-ray decay, so no record is made. The coincidence with the energy level standard means that the energy level of the detected γ-rays is one of 307 keV, 202 keV and 88 keV, and if it is not, it is interference signal and inaccurate, and not recorded by the detector 2.

Figure 5:
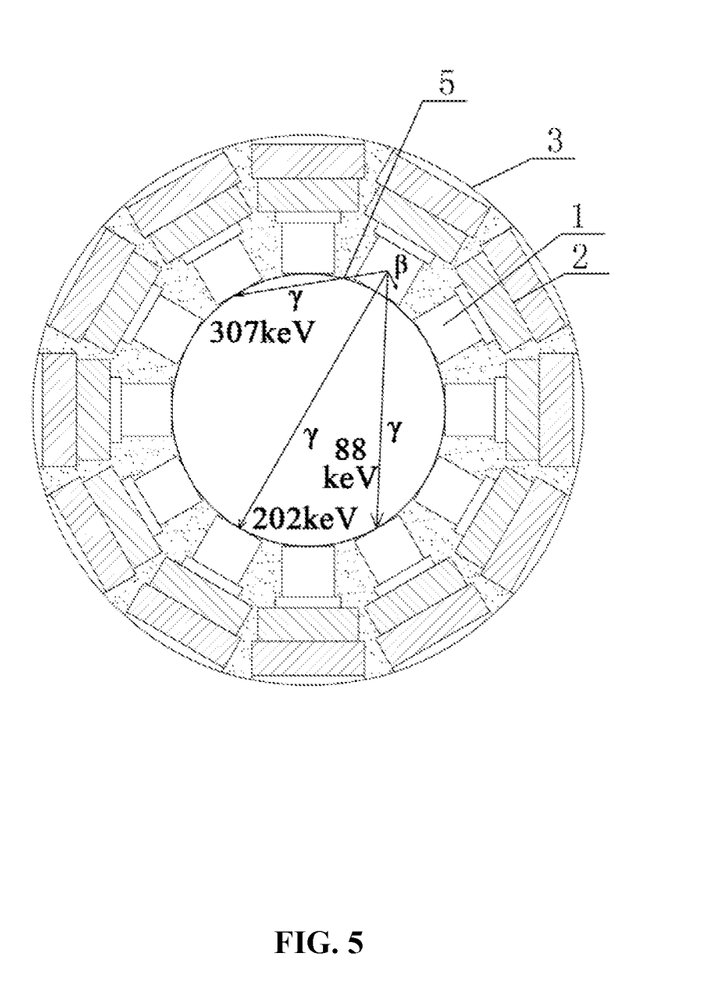
FIG. 5 is a schematic diagram showing three energy levels of γ-rays produced by the decay of β-rays in Example 3.

As shown in FIG. 5, under ideal circumstances, the β-ray decay at a time can produce three levels of γ-rays, which are detected by the corresponding detector 2 after passing through the pipe, and the corresponding time, energy, and position data are recorded.

Within a test time range (for example, 10 minutes), all information of β-rays and γ-rays emitted by the scintillation crystal 1 is recorded in the database, then a time window is designed to sort and screen all data to find the information of β-rays and γ-rays generated by the same decay, and then the corresponding lines of response are obtained according to the position information, and statistics are conducted by the three energy levels of γ-rays. The lines of response corresponding to all events are found out and the mass fraction of the multiphase fluid is calculated according to the energy and path of the lines of response.

By using the intrinsic rays of the scintillation crystal 1 to perform total cross-section measurement, the radioactive sources in the ray measuring device in the prior art can be eliminated, to reduce the system cost and greatly improve the system safety and reliability. In addition, because the half-life of Lu-176 is $2.1 \times 10^{10}$ years, the equipment performance will not degrade caused by the aging of the radiation device, which greatly improves the system stability and service life.

Example 4

According to the method for measuring a total cross-sectional phase fraction of a multiphase flow based on ray coincidence measurement in Example 3, the calculation method of the mass fraction is disclosed in this example, which is detailed as follows:

(1) Recording all effective information of β-rays and γ-rays emitted from the scintillation crystal 1 within a test time range (for example, 10 minutes). Conducting statistics on the number of times each scintillation crystal 1 receives γ-rays emitted by other scintillation crystals 1, as shown in Table 1.

TABLE 1

Statistics of position information of γ-rays with an energy level of 307 keV

| | Number of times each scintillation crystal receives γ-rays | | | | |
|---|---|---|---|---|---|
| | (Emitted) from No. 1 crystal | (Emitted) from No. 2 crystal | (Emitted) from No. 3 crystal | (Emitted) from No. 4 crystal | (Emitted) from No. 5 crystal |
| (Received) by No. 1 crystal | | $N_{21}$ | $N_{31}$ | $N_{41}$ | $N_{51}$ |
| (Received) by No. 2 crystal | $N_{12}$ | | $N_{32}$ | $N_{42}$ | $N_{52}$ |
| (Received) by No. 3 crystal | $N_{13}$ | $N_{23}$ | | $N_{43}$ | $N_{53}$ |
| (Received) by No. 4 crystal | $N_{14}$ | $N_{24}$ | $N_{34}$ | | $N_{54}$ |
| (Received) by No. 5 crystal | $N_{15}$ | $N_{25}$ | $N_{35}$ | $N_{45}$ | |
| (Received) by No. 6 crystal | $N_{16}$ | $N_{26}$ | $N_{36}$ | $N_{46}$ | $N_{56}$ |
| (Received) by No. 7 crystal | $N_{17}$ | $N_{27}$ | $N_{37}$ | $N_{47}$ | $N_{57}$ |
| (Received) by No. 8 crystal | $N_{18}$ | $N_{28}$ | $N_{38}$ | $N_{48}$ | $N_{58}$ |
| (Received) by No. 9 crystal | $N_{19}$ | $N_{29}$ | $N_{39}$ | $N_{49}$ | $N_{59}$ |
| (Received) by No. 10 crystal | $N_{1\text{-}10}$ | $N_{2\text{-}10}$ | $N_{3\text{-}10}$ | $N_{4\text{-}10}$ | $N_{5\text{-}10}$ |

| | Number of times each scintillation crystal receives γ-rays | | | | |
|---|---|---|---|---|---|
| | (Emitted) from No. 6 crystal | (Emitted) from No. 7 crystal | (Emitted) from No. 8 crystal | (Emitted) from No. 9 crystal | (Emitted) from No. 10 crystal |
| (Received) by No. 1 crystal | $N_{61}$ | $N_{71}$ | $N_{81}$ | $N_{91}$ | $N_{10\text{-}1}$ |
| (Received) by No. 2 crystal | $N_{62}$ | $N_{72}$ | $N_{82}$ | $N_{92}$ | $N_{10\text{-}2}$ |
| (Received) by No. 3 crystal | $N_{63}$ | $N_{73}$ | $N_{83}$ | $N_{93}$ | $N_{10\text{-}3}$ |
| (Received) by No. 4 crystal | $N_{64}$ | $N_{74}$ | $N_{84}$ | $N_{94}$ | $N_{10\text{-}4}$ |
| (Received) by No. 5 crystal | $N_{65}$ | $N_{75}$ | $N_{85}$ | $N_{95}$ | $N_{10\text{-}5}$ |
| (Received) by No. 6 crystal | | $N_{76}$ | $N_{86}$ | $N_{96}$ | $N_{10\text{-}6}$ |
| (Received) by No. 7 crystal | $N_{67}$ | | $N_{87}$ | $N_{97}$ | $N_{10\text{-}7}$ |
| (Received) by No. 8 crystal | $N_{68}$ | $N_{78}$ | | $N_{98}$ | $N_{10\text{-}8}$ |
| (Received) by No. 9 crystal | $N_{69}$ | $N_{79}$ | $N_{89}$ | | $N_{10\text{-}9}$ |

TABLE 1-continued

Statistics of position information of γ-rays with an energy level of 307 keV

| (Received) by No. 10 crystal | $N_{6-10}$ | $N_{7-10}$ | $N_{8-10}$ | $N_{9-10}$ |
|---|---|---|---|---|

In Table 1, crystals 1 to 10 are marks for scintillation crystal 1 around the pipe 5 (assuming that there are 10 measuring devices distributed around the pipe 5). In Table 1, $N_{mn}$ is used to record the number of times each scintillation crystal 1 receives γ-rays emitted by other scintillation crystals 1. For example, $N_{47}$ represents the number of times that γ-rays are emitted from No. 4 scintillation crystal 1 and received by No. 7 scintillation crystal 1. Optionally, Table 1 only shows the statistics of γ-rays with an energy level of 307 keV, and the γ-rays with energy levels of 202 keV and 88 keV are shown in similar tables, which are not described here.

(2) Analyzing the compositions of the fluid to be tested. If the fluid to be tested is an oil-water two-phase fluid, the water and oil flow through the pipe for testing.

(1) is repeated to perform statistics on the position information of the γ-rays after passing through the fluid pipe 3, to obtain the tables similar to Table 1. These tables are not listed here. The counted times are represented by $N_{wmn}$. For example, $N_{w47}$ represents the number times that γ-rays are emitted from No. 4 scintillation crystal 1 and received by No. 7 scintillation crystal 1 after passing through a pipe with water flow.

The following formula can be obtained: $N_{wmn}=N_{mn}e^{-\mu_w X_{mn}}$, $\mu_w$ represents the mass absorption coefficient of water to γ-rays, $X_{mn}$ represents the distance between two scintillation crystals 1, for example, $N_{w47}=N_{47}e^{-\mu_w X_{47}}$, $X_{47}$ represents the distance between scintillation crystal No. 4 and scintillation crystal No. 7.

Since $N_{wmn}$, $N_{mn}$ and $X_{mn}$ are all known data, the value of $\mu_w$ can be calculated.

Similarly, the mass absorption coefficient of oil to γ-rays, namely, the value of $\mu_o$, can also be calculated.

(3) When the two-phase mixed liquid of water and oil flows through the pipe, the phase fraction is calculated as follows:

$$N_{lmn}=N_{mn}e^{-(\eta\mu_w+(1-\eta)\mu_o)X_{mn}}$$

η is the percentage of water in the two-phase fluid, and (1−η) is the percentage of oil in the two-phase fluid.

Since $N_{lmn}$, $N_{mn}$, $\mu_w$, $\mu_o$ and $X_{mn}$ are all known data, the value of η can be calculated.

Here, the value of η is measured on the current scintillation crystal 1. To calculate the overall phase fraction, all measured values of the scintillation crystals 1 should be weighted and averaged according to the following formula:

$$\eta_1=\Sigma(X_i/D*\eta_i)/\Sigma(X_i/D)$$

$\eta_1$ is the phase fraction of the two-phase fluid, D is the distance between the two scintillation crystals 1 furthest apart (if the pipe is cylindrical, then D is the diameter), $\eta_i$ is the percentage of water of each scintillation crystal 1 measured in the two-phase fluid, X is the distance between the scintillation crystal 1 that emits γ-rays and the scintillation crystal 1 that receives γ-rays.

Statistics is conducted according to 10 scintillation crystals 1. Each scintillation crystal 1 can receive the γ-rays emitted by the other 9 scintillation crystals 1, and then the weighted average is calculated, to obtain the final mass fraction.

It will be obvious to those skilled in the art that changes and modifications may be made, and therefore, the aim in the appended claims is to cover all such changes and modifications.

What is claimed is:

1. A method, comprising:
   1) disposing a plurality of devices in a circumferential direction of a fluid pipe under test, wherein each of the devices comprises a scintillation crystal and a detector, the scintillation crystal is coupled to the detector, and the scintillation crystal comprises lutetium-176; aligning the scintillation crystal of each device with the fluid pipe, and disposing the scintillation crystal between the fluid pipe and the detector;
   2) decaying the scintillation crystal to emit intrinsic rays;
   3) allowing the intrinsic rays to pass through the fluid pipe under test, and detecting, by the detector, a starting point and an end point of the intrinsic rays, and converting optical signals of the intrinsic rays, by the detector, into electrical signals;
   4) acquiring corresponding lines of responses according to the intrinsic rays produced by each decay and transmission paths thereof; and
   5) finding out all effective lines of responses and calculating a mass fraction of a multiphase fluid based on an energy and path of the lines of responses.

2. The method of claim 1, wherein the scintillation crystal and the detector are fixedly coupled to each other by a couplant.

3. The method of claim 1, wherein in 4), the intrinsic rays produced by each decay comprise β-rays and γ-rays, and effective γ-rays are determined by a coincidence detection technology and an energy detection technology.

4. The method of claim 3, wherein the coincidence detection technology comprises acquiring the γ-rays that are detected within a period of time and coincide with an energy level standard.

5. The method of claim 3, wherein the energy detection technology comprises analyzing and studying shape and noise characteristics of γ-ray and β-ray scintillation pulses, designing a corresponding data acquisition method, eliminating interference and accurately acquiring γ-ray energy information.

6. The method of claim 1, wherein calculating a mass fraction of a multiphase fluid comprises:
   S1: conducting statistics on position information of γ-rays detected by the detector when the fluid pipe under test is in an empty state;
   S2. conducting statistics on position information and energy information detected by the detector when a single-phase fluid flows through the fluid pipe under test, and calculating a mass absorption coefficient of the single-phase fluid for γ-rays;
   S3. conducting statistics on position information and energy information detected by the detector when a multiphase fluid flows through the fluid pipe under test, and calculating a mass absorption coefficient of the multiphase fluid for γ-rays; and
   S4. calculating, based on the mass absorption coefficient of the multiphase fluid and the mass absorption coefficient of the single-phase fluid, the mass fraction of each single-phase fluid in the multiphase fluid.

7. The method of claim 6, wherein S1 is carried out as follows:
   S1.1. making a distinctive mark for each scintillation crystal, measuring a linear distance between every two scintillation crystals, and recording as $X_{mn}$, m and n being marks of the two scintillation crystals, respectively; and S1.2. in the empty state, recording a number of times of γ-rays received by each scintillation crystal from each of other scintillation crystals as $N_{mn}$, m being each of other scintillation crystals emitting γ-rays, and n being the scintillation crystal receiving γ-rays.

8. The method of claim 7, wherein S2 is carried out as follows:

S2.1. when the single-phase fluid flows through the fluid pipe, recording a number of times of γ-rays received by each scintillation crystal from each of other scintillation crystals as $N'_{mn}$, m being each of other scintillation crystals emitting γ-rays, and n being the scintillation crystal receiving γ-rays; and S2.2. calculating a value of μ according to the formula: $N'_{mn}=N_{mn}e^{-\mu X min}$, where μ represents the mass absorption coefficient of the single-phase fluid to γ-rays.

9. The method of claim 8, wherein S3 is carried out as follows:

S3.1. when the multiphase fluid flows through the fluid pipe, recording a number of times of γ-rays received by each scintillation crystal from each of other scintillation crystals as $N''_{mn}$, m being each of other scintillation crystals emitting γ-rays, and n being the scintillation crystal receiving γ-rays; and S3.2. calculating a value of μ' according to the formula: $N''_{mn}=N_{mn}e^{-\mu' X min}$ where μ' represents the mass absorption coefficient of the multiphase fluid to γ-rays.

10. The method of claim 9, wherein in S4, calculating the mass fraction of each single-phase fluid in the multiphase fluid is based on the following formula:

$\mu'=\eta\mu_1+(1-\eta)\mu_2$; where, $\mu_1$ and $\mu_2$ are mass absorption coefficients of each single-phase fluid in the multiphase fluid to γ-rays, η is calculated from the formula and performed by weighted average, to obtain the mass fraction of the multiphase fluid.

\* \* \* \* \*